(12) United States Patent
Byles

(10) Patent No.: US 7,798,746 B2
(45) Date of Patent: *Sep. 21, 2010

(54) MODULAR, SELF CONTAINED, ENGINEERED IRRIGATION LANDSCAPE AND FLOWER BED PANEL

(76) Inventor: Joe Don Byles, 20 Timber Meadow, New Braunfels, TX (US) 78132

( * ) Notice: Subject to any disclaimer, the term of this patent is extended or adjusted under 35 U.S.C. 154(b) by 0 days.

This patent is subject to a terminal disclaimer.

(21) Appl. No.: 11/809,767

(22) Filed: Jun. 1, 2007

(65) Prior Publication Data

US 2007/0237584 A1 Oct. 11, 2007

Related U.S. Application Data

(62) Division of application No. 10/600,625, filed on Jun. 20, 2003, now Pat. No. 7,407,340.

(60) Provisional application No. 60/390,097, filed on Jun. 20, 2002.

(51) Int. Cl.
*E02B 13/00* (2006.01)

(52) U.S. Cl. .............................. 405/45; 405/43; 405/50; 47/48.5; 47/80

(58) Field of Classification Search .................. 405/36, 405/38, 43–46, 50; 47/20.1, 48.5, 79, 80; 239/145, 200, 207
See application file for complete search history.

(56) References Cited

U.S. PATENT DOCUMENTS

| | | | |
|---|---|---|---|
| 1,988,307 A | 1/1935 | Temple | |
| 2,249,197 A | 7/1941 | Brundin | |
| 2,346,029 A | 4/1944 | Jennings | |
| 2,799,121 A | 7/1957 | Modeweg | |
| 2,850,843 A | 9/1958 | Marbury | |
| 3,058,263 A | 10/1962 | Reynolds | |
| 3,307,360 A | 3/1967 | Bailly | |
| 3,908,385 A | 9/1975 | Daniel et al. | |
| 4,023,506 A | 5/1977 | Robey | |
| 4,061,272 A | 12/1977 | Winston | |
| 4,065,926 A | 1/1978 | Brandt | |
| 4,117,685 A | 10/1978 | Skaife | |
| 4,188,154 A | 2/1980 | Izatt | |
| 4,257,191 A | 3/1981 | Holter et al. | |
| 4,312,152 A | 1/1982 | Drury et al. | |
| 4,628,966 A | 12/1986 | Kanao | |
| 4,771,572 A | 9/1988 | Higa | |

(Continued)

FOREIGN PATENT DOCUMENTS

DE 4343476 6/1994

(Continued)

*Primary Examiner*—Frederick L Lagman
(74) *Attorney, Agent, or Firm*—John C. Cave; Gunn, Lee & Cave, P.C.

(57) ABSTRACT

An ornamental planting landscape irrigation distribution and reservoir product and method ecosystem employing a substantially continuous panel on the soil surface on which ornamental landscape plantings are placed or produced, the panel having a primary, lateral water distribution structure which distributes water from a water charging inlet through the lateral area to the panel periphery, where it is restrained, the primary water distribution structure being such that when filled with water or completely submerged in water, air is trapped by the gaps and spaces of the material for ornamental landscape plant usage.

41 Claims, 7 Drawing Sheets

SCHEMATIC OF PREFERRED EMBODIMENT OF ENGINEERED LANDSCAPE/FLOWER PANEL SHOWING CROSS SECTION VIEW AND ALL COMPONENTS.

U.S. PATENT DOCUMENTS

| | | |
|---|---|---|
| 4,791,755 A | 12/1988 | Bilstein |
| 4,832,526 A | 5/1989 | Funkhouser, Jr. |
| 4,903,432 A | 2/1990 | Velagaleti et al. |
| 4,908,984 A | 3/1990 | Lenke |
| 5,074,708 A | 12/1991 | McCann |
| 5,133,151 A | 7/1992 | Blok |
| 5,232,159 A | 8/1993 | Abbate |
| 5,306,317 A | 4/1994 | Yoshizaki |
| 5,344,470 A | 9/1994 | Molnar |
| 5,802,763 A | 9/1998 | Milstein |
| 5,938,372 A | 8/1999 | Lichfield |
| 5,944,444 A | 8/1999 | Motz et al. |
| 6,161,776 A | 12/2000 | Byles |
| 6,221,445 B1 | 4/2001 | Jones |
| 6,712,552 B1 | 3/2004 | Kepler et al. |
| 6,858,272 B2 * | 2/2005 | Squires ........................ 428/17 |
| 7,407,340 B2 | 8/2008 | Byles |
| 7,682,103 B2 | 3/2010 | Byles |
| 2004/0020109 A1 * | 2/2004 | Byles ....................... 47/1.01 F |
| 2004/0065012 A1 | 4/2004 | Byles |
| 2004/0200141 A1 * | 10/2004 | Whitcomb .................. 47/32.7 |

FOREIGN PATENT DOCUMENTS

| | | |
|---|---|---|
| JP | 404034098 A | 2/1992 |

* cited by examiner

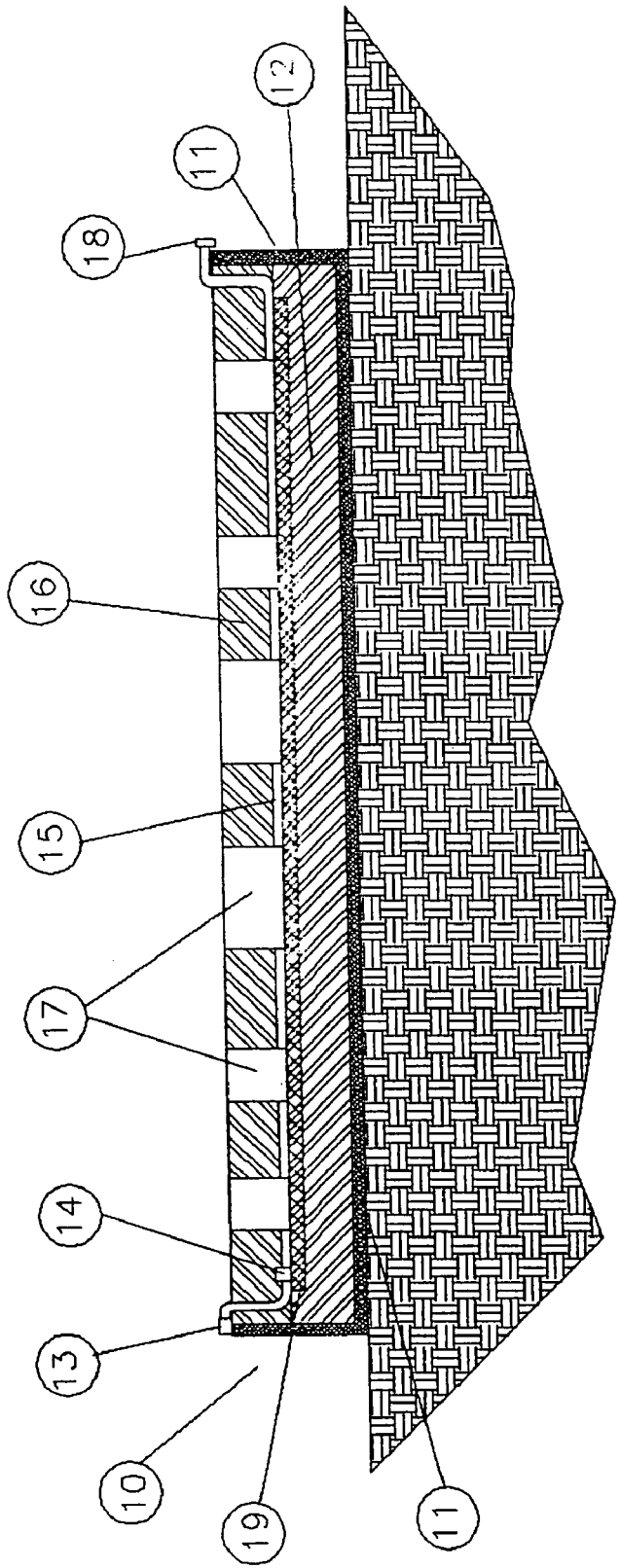
FIGURE 1. SCHEMATIC OF PREFERRED EMBODIMENT OF ENGINEERED LANDSCAPE/FLOWER PANEL SHOWING CROSS SECTION VIEW AND ALL COMPONENTS.

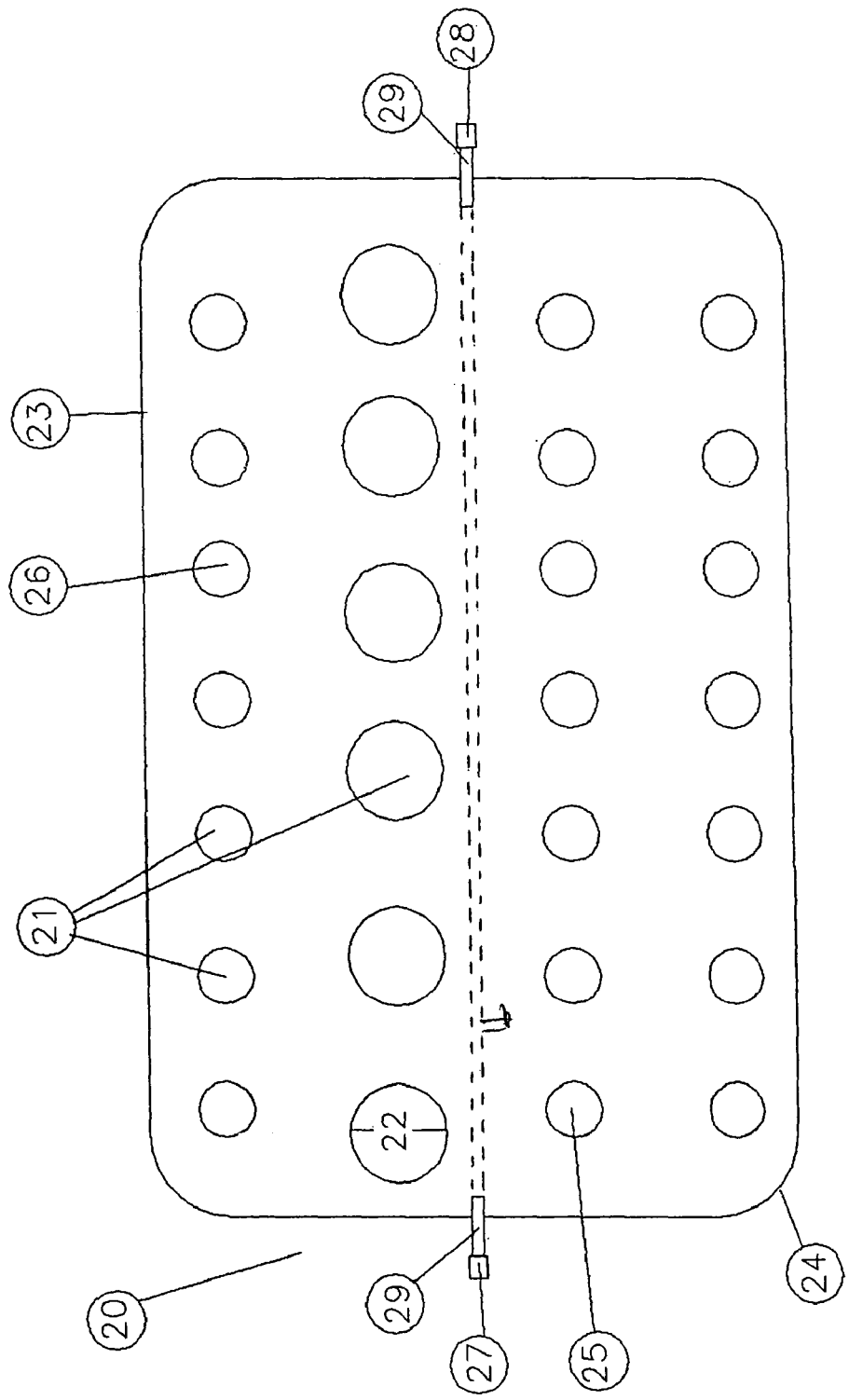
FIGURE 2. SCHEMATIC TOP VIEW OF ENGINEERED LANDSCAPE/FLOWER PANELS SHOWING POSSIBLE CONVFIGURATION OF PRE-CUT PLANTING HOLES.

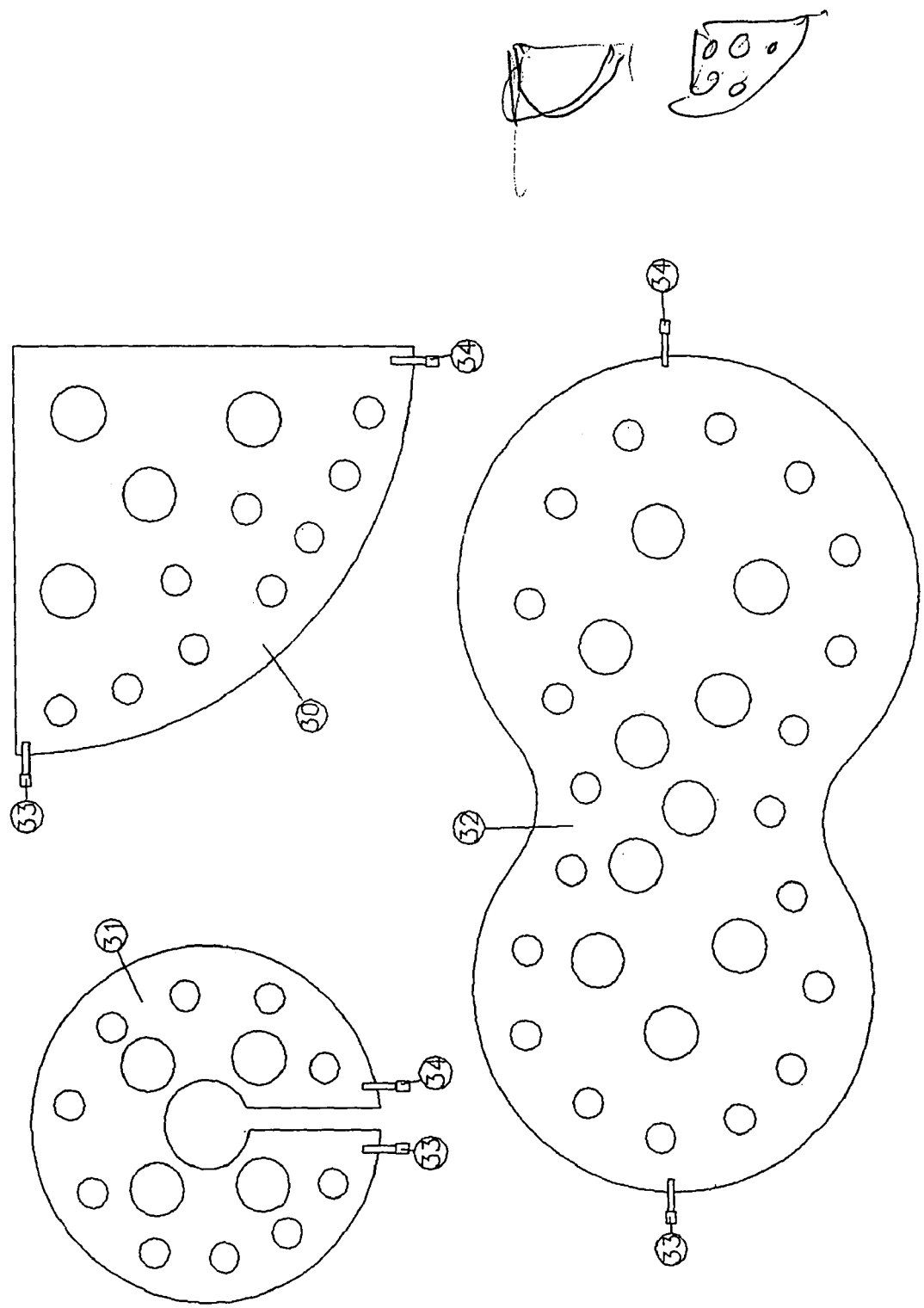
FIGURE 3. ALTERNATE SCHEMATIC TO VIEW OF SEVERAL EMBODIMENTS SHOWING VARIOUS SHAPES FOR VARIOUS INSTALLATIONS

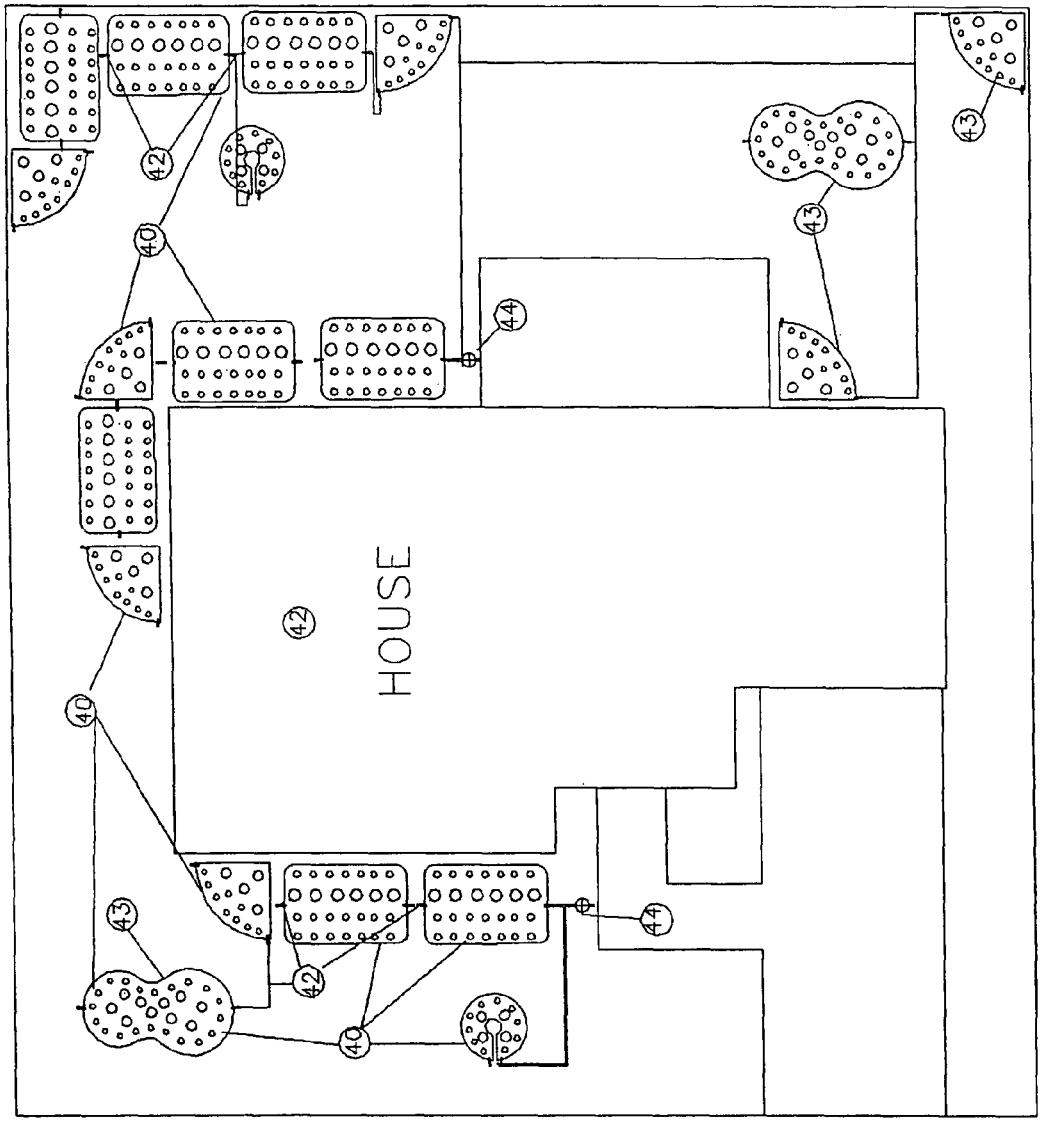
FIGURE 4. INSTALLATION OF SEVERAL ENGINEEERED LANDSCAPE/FLOWER PANELS IN TYPICAL LANDSCAPE SITUATION AROUND HOUSE

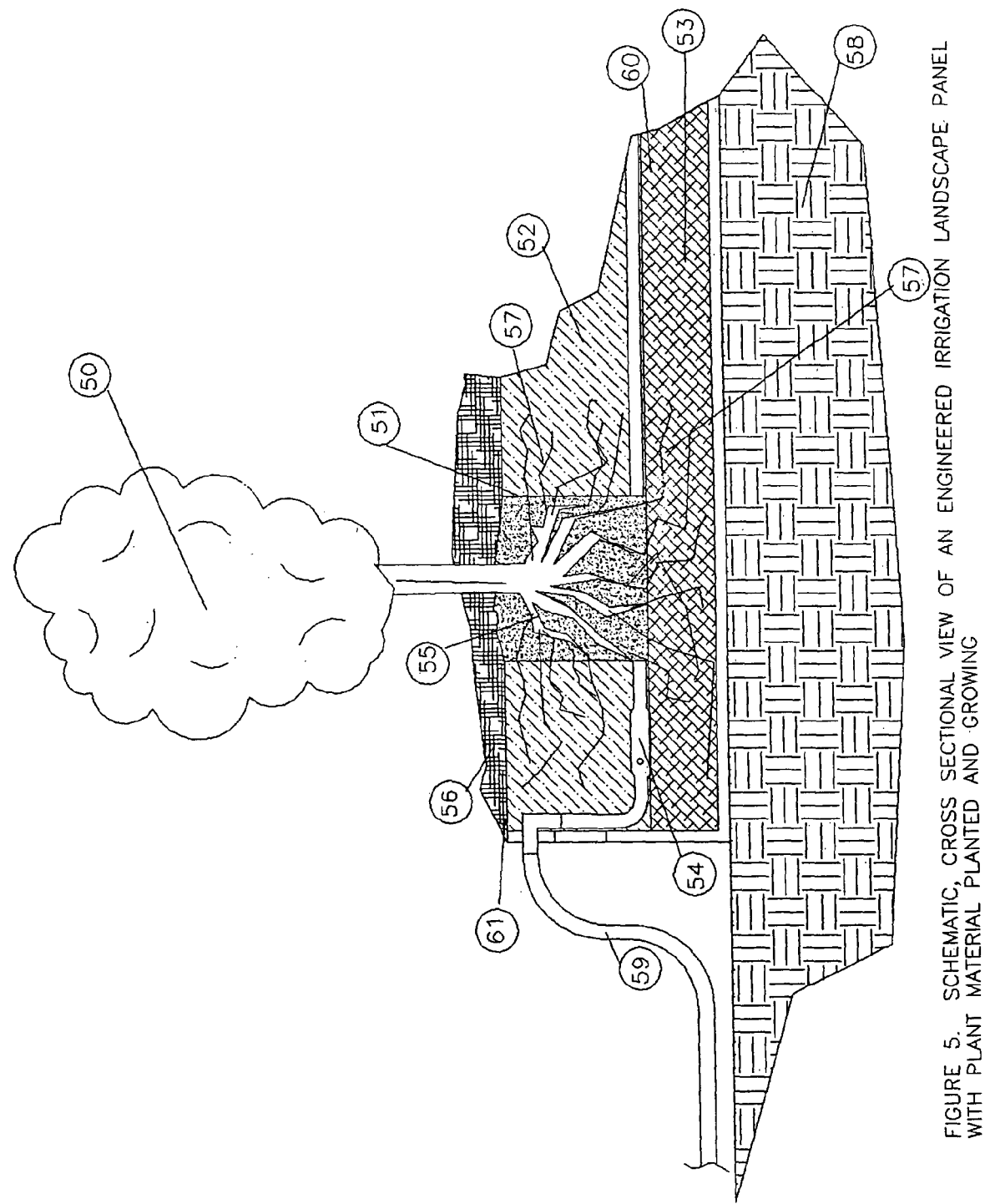
FIGURE 5. SCHEMATIC, CROSS SECTIONAL VIEW OF AN ENGINEERED IRRIGATION LANDSCAPE PANEL WITH PLANT MATERIAL PLANTED AND GROWING

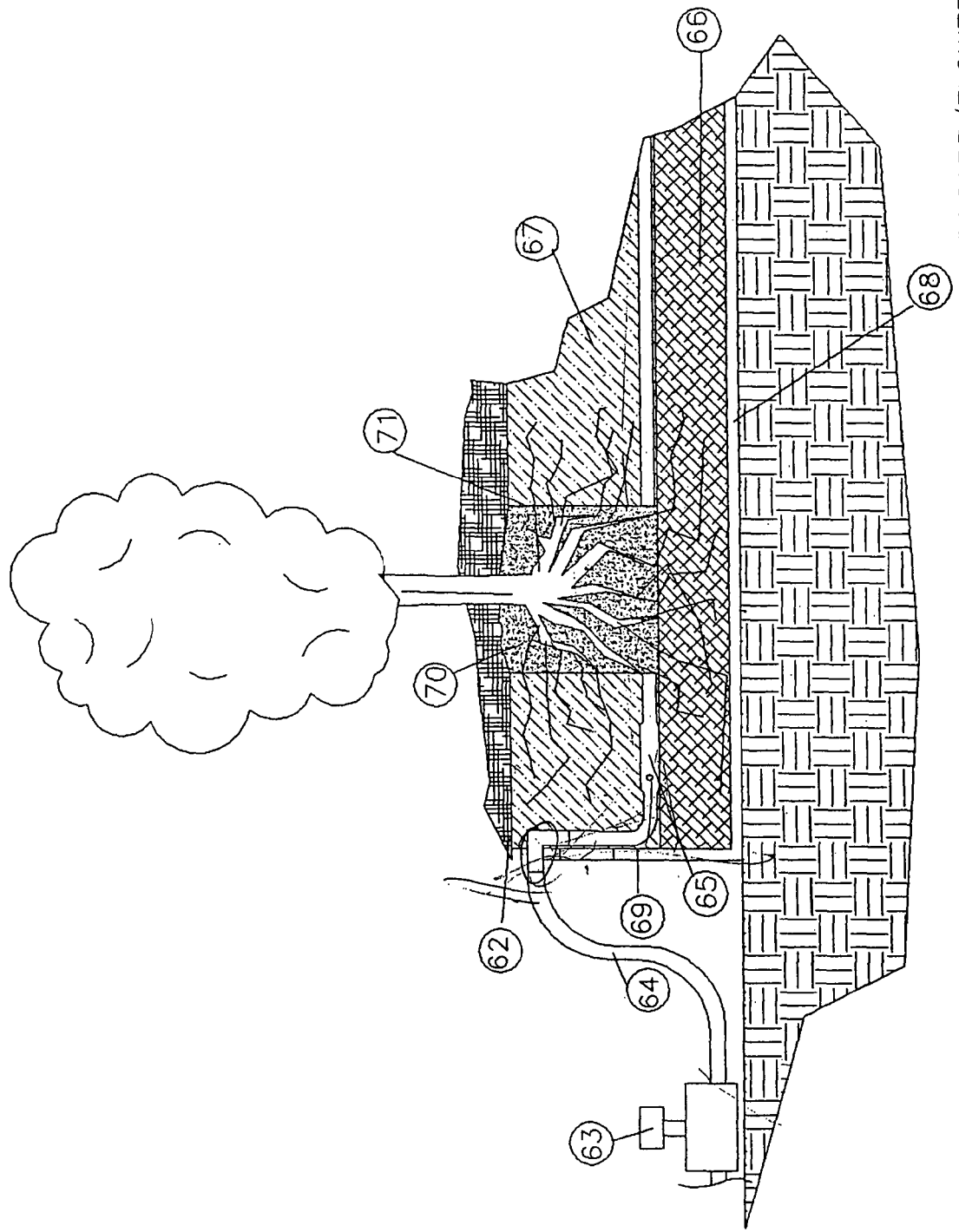
FIGURE 6. SCHEMATIC VIEW OF AN ENGINEERED IRRIGATION LANDSCAPE/FLOWER PANEL CONNECTED TO PRESSURIZED WATER SOURCE.

$$PR = \frac{96.3 \times FR}{60 \times SF}$$

PR = PRECIPITATION RATE
FR = FLOW RATE GPH
SF = SQUARE FOOTAGE OF PANEL

FIGURE 7. EQUATION FOR CALCULATION OF PRECIPITATION RATE OF ANDSCAPE PANEL

MODULAR, SELF CONTAINED, ENGINEERED IRRIGATION LANDSCAPE AND FLOWER BED PANEL

CROSS REFERENCE TO RELATED APPLICATION

This application is a divisional of U.S. patent application Ser. No. 10/600,625, filed Jun. 20, 2003, now U.S. Pat. No. 7,407,340, which claims the benefit of prior Provisional Application No. 60/390,097, filed Jun. 20, 2002, both entitled "Modular, Self Contained, Engineered Irrigation Landscape and Flower Bed Panel."

BACKGROUND OF THE INVENTION

This invention relates to permanently installed irrigation systems and more specifically to underground, permanently installed irrigation systems for the irrigation and planting of landscape and flower beds that conserve water which decreases labor requirements for the installation of the flower bed.

The goal of any installed landscape and flower bed irrigation system is to irrigate the target landscape plants as efficiently as is possible with minimum labor and parts, and therefore, the lowest installed cost possible. If these requirements are met, the water required to irrigate the landscape and flower bed plants is conserved and the cost of installing the landscape/flower bed irrigation system is minimized. Current state of the irrigation systems for landscape/flower beds can be broken into three broad categories; sprinklers, drip and flood irrigation.

One of the earliest forms of irrigation is the flood irrigation concept. This type of irrigation requires that the flower bed area to be irrigated be manipulated and contoured such that the water will flow into all of the required areas to be irrigated without leaving the intended area before the water has had sufficient time to soak into the surface soil. This requires labor intensive berming of the perimeter of the landscape/flower bed area and a source of water emission contained within the bermed perimeter. The benefits of this type of landscape/flower bed irrigation are low initial cost of the irrigation system with regard to materials and ease of installation. The drawbacks of this form of flood irrigation for a landscape/flower bed is inefficiency due to evaporation as the water sits on the surface of the bed and excessive loss of water due to deep percolation past the root zone of the plantings in the landscape/flower bed. Another drawback of the conventional landscape/flower bed with a flood irrigation system is the high level of labor required in the excavating and planting of the bed. The bed must have a berm completely around the perimeter and the landscape plants/flowers must be located at the proper depth. Also, for a healthy flower bed it is often necessary to dig down 12 to 18 inches and amend the soil to provide suitable growing conditions for the plantings. For landscape and flower plants, the soil must be of a texture to allow for water and air to be available to the plant at all times. Still another drawback of flood irrigation for flower/landscape beds is that by definition the entire area of the bed is flooded, providing moisture for the weeds/weed seeds which exist in the flower/landscape bed base soil, promoting the growth of the weeds. This unintended weed growth increases the labor requirement for maintaining a well-kept flower landscape bed. The unintended weed growth can also result in increased chemical herbicide weed killer usage, which can result in increased chemical run-off and environmental damage. Altogether, flood irrigation has been low on efficiency and high in labor requirements for landscape/flower beds installation of the bed and irrigation system.

The second form of irrigation to be discussed, sprinkler irrigation, is by far the most commonly used form of irrigation for landscape/flower beds. This form of irrigation utilized in flower/landscape beds consists of pipes located underground with shrub risers with spray nozzles threaded on them, referred to as fixed spray risers, or pop up spray head or sprinkler devices which pop up and then retract underground in between irrigation events. The spray nozzles affixed to either fixed risers or pop up risers spray out water in a pattern, which sprays out over the entire flower bed/landscape area. Due to the irregular shape and varying width of flower/landscape beds, it is often impossible to target spray head water only on the intended flower/landscape bed without significant over spray into unintended areas. Also, the distribution of water from these sprinkler devices is often interrupted in flower/landscape beds due to the height of the plantings in these areas creating irregular wetting patterns. Sprinkler irrigation in flower/landscape beds suffers from inefficiencies found in sprinkler irrigation of turf areas, namely high evaporation losses from being thrown in the air and evaporation from collecting on the leaf area material. In addition to the inherent distribution inefficiencies of broadcasting water through the air, sprinkler irrigation also suffers from the basic inefficiency of attempting to irrigate the entire flower/landscape bed while the planting area may only cover as little as 50 percent of the bed. In addition to irrigating the entire area automatically cutting the efficiency, the moisture not irrigating the bedding plants will irrigate weeds and weed seeds in the landscape bed soil, increasing again the need for herbicide chemicals. In all, sprinkler irrigation for flower/landscape beds, while being the most widely used form of irrigation, falls short of efficiency and is labor intensive and complicated to install and design.

The third form of prior art irrigation system is known as drip irrigation. Drip irrigation for flower/landscape beds comes in two installation methodologies, subsurface and surface drip irrigation. First for subsurface drip irrigation, a drip emitter line is buried six to twelve inches below the flower/landscape bed with the lines being twelve to eighteen inches apart. The emitters emit water at a rate from 0.5 to 2 gallons per hour and are subsurface drip emitter layout grid is to water the soil beneath the flower/landscape bed completely. The grid results in subsurface watering, but is subject to several limitations and inefficiencies. The physics of water movement through various textures of soil can act to limit the efficiency of subsurface drip irrigation. In a coarse soil, such as sand, the water moves outward and upward due to capillary action, but to a greater extent once the soil is saturated, the water moves downward due to gravity force. This basic form of movement happens in all soil types, to the greatest extent in sand and to a lesser extent in a clay soil. As water drops below the drip line grid, which is already six to eight inches deep, it passes out of the root zone of flower/landscape plants. In addition to dropping below the root zone of the plantings, the fact that the grid irrigates the entire bed area, where the plantings may only occupy 50 percent of the bed area, the efficiency of the water placement is reduced. Placing the drip line below the bed surface creates several maintenance considerations, such as roots growing into the many individual, low flow emitter devices, cutting of the multiple emitter lines from shovels and maintenance tools, and plugging of the small emitter orifices with soil and sediment. The prevention of roots growing into the emitters can be accomplished by impregnating the plastic, which the emitters are molded out of with a chemical herbicide such as Treflan. To prevent damage from tools and shovels, the lines must be buried as deep as possible, however, this just makes the problem of water loss below the root zone greater. In addition to efficiency and maintenance concerns, there is also the increased labor requirements of installing the subsurface system.

In a modification of subsurface drip, U.S. Pat. No. 5,921, 711, issued to Jonas Sipaila, entitled *Subsurface Fluid Distribution Apparatus and Method*, teaches a drainage and irrigation system based upon an unpressurized half pipe contained within a chamber filled with a significant depth of washed sand material. In this patent, it teaches excavation down to a required depth, laying of a liner, placement of a water channel, non-pressurized pipe, and filling with a washed sand material of significant depth (13 inches) to provide a growing root zone for the planted plant material. While this patent method does provide a controlled root zone, it is very expensive to provide the excavation and material for the root zone growth. Also, the method suffers from being the most labor intensive of all types of flower/landscape bed installation, requiring complete excavation to a significant depth and total replacement of the root zone growth material. Another limitation of this type of system is that it must be installed perfectly flat and in a descending order if more than one unit is installed in a serial manner. So that in addition to all of the additional labor requirements, there is extensive grading and leveling requirements. This system attempts to improve efficiency but does so at great expense in cost of labor and materials. It markedly increases the time required to establish a flower/landscape bed.

The next form of drip irrigation for flower/landscape beds is surface drip irrigation. In this form of drip irrigation, the drip emitters are located on the surface of the flower/landscape bed, typically with an emitter for each plant. This form of irrigation does provide increased efficiency due to watering at the plants only but is extremely sensitive to disturbance on the surface by tools and maintenance activities. This type of drip irrigation is the most utilized form of drip irrigation. The small molded and extruded plastic components of this form of irrigation are easily destroyed by normal gardening activities such as raking and digging, removing weeds, planting new flower/landscape beds, etc. Another danger is that because of the small diameter tubing and emitters that the point emission devices get moved away from the intended watering areas, increasing inefficiency in the irrigation system. While the surface drip irrigation system is not as labor intensive as the flood, sprinkler and subsurface drip irrigation systems to install, it is still fairly design and labor intensive to calculate the proper flow rate for each emitter/planting combination and the proper layout of the entire system.

In a recent irrigation system for the irrigation of turf grass invented by the inventor of the current invention, U.S. Pat. No. 6,161,776, entitled *Subsurface Mat Amendment System and Apparatus* was developed to provide a simpler irrigation system specifically for the irrigation of turf grass. This system can be classified as a form of subsurface irrigation but because it is a continuous product intended for turf, it is not efficient for the irrigation of flower/landscape plantings.

Aside from the labor requirement of installing whatever form of irrigation system is selected for the flower/landscape bed, there is a significant element of labor required in the preparation of the flower bed itself. Typical steps required to establish a flower/landscape bed in a typical turf grass lawn include: laying out the shape of the area, removing the turf grass, weeds and stones to a depth of 12 inches, bringing whatever soil amendments might be required for the soil base material, incorporating the amendments or tiling the soil to give a friable, open moisture of soil, creating border for the flower/landscape bed to prevent invasive turf grass and weeds from penetrating the bed, applying a weed killer to kill any weed or grass left in the bed, and then finally smoothing out the final surface of the bed. Once all of these tasks are completed, then the form of irrigation system can be installed to provide moisture to the plants within the bed.

All in all, no none prior art irrigation system for flower/landscape beds has been developed which is cost effective, easy to install, efficient and significantly reduces the labor requirement of installing irrigated flower/landscape beds, while also reducing the labor requirement of the actual preparation of the flower/landscape bed itself.

SUMMARY OF THE INVENTION

It is therefore a general objective of the current invention to overcome the above-described limitations and labor requirements associated with prior art irrigation systems for flower/landscape beds and also the labor requirements for installing the flower/landscape bed itself.

In order to accomplish the objectives of the current invention, the system apparatus according to the invention includes in one preferred embodiment a panel made up of multiple materials including a plastic base material, one or more layers of a flexible porous, permeable material such as polyurethane foam, a length of tubing such as polyethylene tubing, one or more flow controlled emission device(s), an optional water holding material such as a polymer crystal, and connector devices to interlock the panel with other panels if desired to form a multiple panel flower/irrigation bed if desired and an optional rigid mesh material. The base plastic material that forms the bottom and sides of the panel can range from a flexible polyethylene sheet to a semi-flexible vacuum formed thermo-plastic shell to a rigid vacuum formed thermo-plastic shell or an injection molded rigid plastic shell combined with a flexible polyethylene material to form the bottom tray. The base plastic material can very in thickness depending upon the toughness of the materials but should be such that it is durable enough to withstand being placed upon sticks, rocks or other possible projections without penetrating the material. The base plastic material can be solid or with a slight porosity in all or certain areas to allow the movement of water and air through the rest of the panel. The flexible porous, permeable material is an open cell reticulated, polyether polyurethane foam or in an alternate embodiment, bonded crumb rubber and polyurethane material. The length of tubing that is embedded within the panel is a typical polyethylene tube of ⅛" to 1-inch diameter as typically used in irrigation applications or in an alternative embodiment, a cross-linked polyethylene material. The flow controlled emission device is a typical flow control disk with a various flow rate from ½ to 60 gallons per hour depending upon the number emission devices or the desired precipitation rate of the panel. The flow control device can also be simply a hole or open end of a fitting which flows water in a controlled manner into the panel. The water holding polymer gel is that typically available for holding water in a soil medium. The non-sealed metallic sheath is a wound metal material made from non-corrosive metal and is not sealed to provide water movement through the conduit. The push to connect fitting can be a barbed push on fitting or an insert compression type of fitting typically available within the irrigation industry for use with polyethylene pipes. The optional wire mesh fabric like commonly available chicken wire or screen mesh can be added to the panel to provide additional protection to the finished composite panel.

The invention apparatus in one preferred embodiment is assembled to a complete product as follows:

1. The flow control(s) unit(s) is inserted into the appropriate length of polyethylene tubing.
2. The push to connect connector (either a compression type of fitting as is typically used with polyethylene tubing in the irrigation industry or a gripping configuration such as a threaded or grip device) is inserted full depth into one end of the polyethylene tubing.
3. The tubing/flow control(s)/push to connect fitting assembly is inserted into the optional flexible non-sealed metallic conduit.
4. The base plastic shell material has a first layer of the flexible polyether polyurethane foam inserted and secured into it.
5. The optional polymer water holding gel is secured on the top of the first polyether polyurethane foam material.
6. The tubing/flow control/push to connect fitting/optional flexible non-sealed metallic conduit is then placed on top of the first layer of foam/polymer gel crystals.
7. Another top layer of foam material is created with a geometric pattern of holes ranging from 1 inch to 12 inches to create holes into which the flower/landscape plants can be placed into the panel.
8. The top layer of foam with the planting holes is secured onto the plastic/foam/polymer gel/water emitting configuration to create the final pane configuration.

The panel is now a complete integral unit that can now be laid down as a single unit or connected to a series of units to create the desired flower/landscape bed. The flower/landscape panel bed system is installed by simply placing the panels in the desired area where a flower/landscape bed is desired. The panels can be placed on surfaces of turf grass, where the grass beneath the panel will die and compost beneath the panel and not emerge through the panel, leaving just the flower/landscape panels with no sub growth through. The panels can also be placed directly on uncultivated soil of any type, as the flowers/landscape plants grow within the panel material. It has even been demonstrated that a thriving flower bed can be grown on solid asphalt in Phoenix, Arizona on the western side of a building. The panels can be placed in an arrangement where one panel connects directly into another panel or is separated and connected by a length of polyethylene tubing. Once the final panel is attached, an end plug or closure is connected to complete the series of panels or panel. Each individual panel should be fairly level to facilitate water distribution. The initial panel is then connected to a pressurized water source and water fills the emission lines of all the panels simultaneously. The water fills the lower reservoirs of each panel. The landscape flowers and plants are planted into the panels by simply removing the flowers/plants from the shipping pots/containers or trays that they came in from the nursery or point of purchase and inserting the root ball/soil combination directly into the hole. Once all the holes re filled as desired, mulch is then placed on the surface of the panels and into the holes of any planting holes that were not filled, if any. As a final step, a border of landscape blocks or stones or mulch can be added around the panels. Once charged with water, the panels provide water air and a root support structure to the roots growing out of the soil/soil combination into the growth matrix, and also a structure for the plant support.

THEORY OF OPERATION

The engineered, irrigation flower and landscape bed panel provides an instant, irrigated flower/landscape bed ready for the planting of flowers. It eliminates the need to dig out beds, cultivate soil, import soil amendments, etc. Once connected to a pressurized water source, each connected panel(s) fills with water through the first layer of porous, permeable material (typically polyether polyurethane foam).

The landscape/flower soil/root ball of the each plant rests on top of the bottom layer of foam material in the pre-cut holes in the top layer of foam.

The top layer of foam material is covered with mulch to hold moisture in the panel and create a moist, humid 100% humidity zone with a structure that the plant roots can penetrate into.

The plant roots grow out of the soil/root ball and into the top layer of foam material through the sides of precut holes.

The roots are also able to grow into the bottom layer of foam to pick up moisture if necessary for support of the flower/landscape plants.

The open cell foam material forms an optimum growth medium for the planted flowers and landscape beds as it contains ample amounts of readily available water and trapped air in an optimum structure for roots to grow into. With a partially porous to non-porous bottom and sides, there is no loss of the irrigation water to the lower surface that the landscape panel is placed on. With the mulch surface on the top of the panel evaporation through the upper surface of the landscape panel is also minimized, creating a watering situation where all the water emitted into the landscape panel is available to the landscape plants. The dewatering of the panels is accomplished mainly through the transpiration of the planted material within the panels.

Water movement throughout the panel also occurs via condensation throughout the panel material as the matrix material below the mulch is at 100 percent humidity. The water is constantly redistributing throughout the panel allowing for even water distribution not available in a conventional flower bed soil situation. With the panel installed over the base soil weeds and weed seeds that were present in the soil are not allowed to grow up through the panel material, making for a flower or landscape bed with no weeds. When installed over any type of soil area or existing landscape, the landscape panels provide a means to have a lush landscape/flower bed with minimal input of labor and water.

The landscape/flower panels, once installed with the flower/landscape plantings, provide a permanent irrigation planting bed system with several advantages over conventional landscape/flower beds with irrigation. Some of the advantages include:

1. Significantly less labor is required to complete the installation of the landscape/flower bed and irrigation system (no trenching, laying pipe, installing heads, adjusting heads, covering trenches, amending soil, tiling, removing weeds, applying chemicals, digging holes, etc). Each landscape panel is an independent, self-contained panel with irrigation.
2. There are no hydraulic calculations for the irrigation system and design steps.
3. There are no critical emission device placement requirements.
4. There is no need to prepare the base soil with tilling, amendments, etc.
5. There is no need for the landscape/flower bed to be grown over a suitable soil substrate.
6. There is a reduced need to utilize herbicides for the killing of weeds that would grow up from the base soil as they are blocked by the landscape panel.
7. Over spray and wind drift are eliminated as the water is contained only in the irrigation panel and not sprayed into the atmosphere.

8. Water loss due to deep percolation is greatly reduced.

9. Evaporation of irrigation water is greatly reduced.

10. Runoff outside the flower/landscape bed area is eliminated as the landscape panel contains the irrigation water within the root zone.

11. The modular, self-contained panels require no excavation as prior art systems do.

12. The non-conventional high flow rate of the discharge device within the landscape panel discourages plugging and detrimental root growth around the emission device.

The above listing of benefits and features, considered with the hardware landscape panel descriptions from above will become more evident when considered with the following drawings and descriptions.

BRIEF DESCRIPTION OF THE DRAWINGS

FIG. 1 is a schematic of one preferred embodiment of the engineered landscape/flower irrigation panel showing a cross sectional view and all the components it is made up of.

FIG. 2 is a schematic top view of the landscape/flower irrigation panel showing a possible configuration for the pre-cut planting holes.

FIG. 3 is an alternate schematic top view of one embodiment showing the emission device and potential connection points.

FIG. 4 shows an installation of several engineered landscape/flower panels in a typical landscape situation.

FIG. 5 shows a cross sectional view of an engineered irrigation landscape/flower panel with plant material planted and growing.

FIG. 6 shows a schematic view of an engineered irrigation landscape/flower panel completely connected to a pressurized water source.

FIG. 7 shows an equation of how to calculate the precipitation rates of a panel for area vs. emission flow rate.

DESCRIPTION OF THE PREFERRED EMBODIMENTS

FIG. 1 is a schematic of one preferred embodiment of the engineered landscape/flower irrigation panel showing a cross sectional view and all the components it is made up of.

The landscape/flower irrigation panel 10 is made up of a non-porous to partially porous bottom and side liner 11 made of a suitable polymer material, a bottom layer of porous, permeable material 12, preferably made of an open cell polyether polyurethane foam, a connection fitting 13 for connection to a pressurized water source, one or more emission devices 14 connected to a distribution tube 15 of suitable tube material such as polyethylene which traverses the panel between the bottom layer of porous, permeable material 12 and a top layer of porous, permeable material 16 which has holes 17 of appropriate diameter drilled into it. The holes 17 typically range in diameter from 2 inches to 12 inches to accommodate various diameter bedding and landscape plants. The end of the traversing distribution tube 15 terminates with a connection fitting 18 that can be either plugged or connected to additional tubing and run to another panel.

A layer of water absorbing polymer gel 19 can be located between the layers of porous, permeable material 12 and 16 to provide additional water storage, however the polymer gel can be located anywhere appropriate within the panel.

Although the preferred embodiment is described as having two layers of porous, permeable material, it can be readily understood that the porous, permeable material can, alternatively, be a single layer of material. In this alternative embodiment, the holes 17 can be cut into but not through the single layer of material to have, in effect, the same structure as the preferred embodiment.

FIG. 2 is a schematic top view of the landscape/flower irrigation panel showing a possible configuration for the pre-cut planting holes. The panel 20 is made up of all of the elements explained in FIG. 1. The pre-cut holes 21 can be in a variety of diameters 22 and arrangements as deemed optimum for a particular planting bed region. The diameters 22 can range typically from 2 inches to 12 inches or greater depending on the particular planting material to be established in the bed. The outer perimeter of the landscape panel 23 can have any arbitrary shape such as rounded corners 24 to provide an artistic or functional flower/landscape bed. The overall shape could be round, arbitrary, square, or whatever would be deemed suitable for the particular situation.

The lower layer of porous, permeable material 25 and distributed water absorbing polymer gel 26 will be visible and accessible through the pre-cut planting holes 21. The attachment fitting 27 and continuation/termination fitting 28 can also be seen from the top view, with a portion of the distribution tubing 29.

FIG. 3 is an alternate schematic top view of several embodiments showing alternate possible shapes for various installations. The engineered landscape/flower beds can take on various geometric shapes as seen from a schematic top view such as pie shaped 30, as would be used in the corner of an intended flower or landscape bed, circular 31 as would be used around a growing tree, or in an arbitrary shape 32 as would be used in a flower bed garden area. The connections 33 and terminations 34, and all other elements are as shown in FIGS. 1 and 2 above.

FIG. 4 shows an installation of several engineered landscape/flower panels in a typical landscape situation. The various shapes of engineered landscape/flower panels 40 are installed around a schematic house 41. The various panels 40 are connected serially 42 together when in proximity to each other. The stand alone beds 43 are connected to a water source from an appropriately pressurized water connection 44. The entire installation is pressurized from valves supplying the irrigation water.

FIG. 5 shows a cross sectional view of an engineered irrigation landscape/flower panel with plant material planted and growing.

The schematic picture shows a living, growing plant 50 that is planted into a pre-cut hole 51 in the top layer of porous, permeable material 52.

The roots of the plant 50 are growing into the top layer of porous, permeable material 52 and the bottom layer of porous, permeable material 53.

The emission device 54 emits water into the top and bottom layers of porous, permeable material 52 and 53.

The plant root and sol ball 55 is inserted into then pre-cut hole 51 of the panel.

Emitted water collects in the bottom layer of the porous, permeable material 53 and moves through the top layer 52 through a combination of wicking action, mechanical movement and travel as water vapor where it can recondense in the top layer of porous, permeable material 52 as available water the plant roots 57.

The plant roots 57 can also grow into the bottom wicking layer 53 and extract as much moisture as necessary. Because of the unique open cell structure of the wicking material 52 and 53, preferably polyether polyurethane foam with open cells, air is trapped in the material and constantly available to the roots 57 of the plant. The panel has zones within it of varying moisture level, from nearly saturated to lightly moist.

The plant roots 57 will propagate in the appropriate zones to supply adequate air and moisture as needed.

The roots 57 growing into the layers of porous, permeable material 52 and 53 also provide stability to the plant. The landscape/flower bed irrigation panel is located on a base material 58 of either soil or any solid material. The panel is connected to a pressurized water source through tube 59 and water is run periodically as needed to maintain moisture within the panel. The water holding polymer gels are optionally contained in area 60. The wire mesh to prevent damage to the panel would be contained in area 61.

FIG. 6 shows a schematic view of an engineered irrigation landscape/flower panel completely connected to a pressurized water source. The panel 62 is connected to a valve mechanism 63 which can either be manual or controlled automatically through a clock controller. The water flows into the distribution tube 64 and out the emission device 65 and into the panel wicking material 66 and 67. Because of the nonporous to partially porous bottom and sides 68 and 69, the water does not or very minutely flows into the base material 69 that the panel is installed over. The water moves into the soil and root ball 70 through capillary action of the soil in the pre-cut hole 71.

The water moves into the top layer of porous, permeable material 67 through vapor transfer or mechanical movement.

FIG. 7 shows an equation of how to calculate the precipitation rates of a panel for area vs. emission flow rate.

The above described preferred embodiments are intended to illustrate the principles of the invention, but not to limit the scope of the invention. Various other embodiments and modifications to these embodiments may be made by those skilled in the art without departing from the scope of the invention as described.

I claim:

1. A method of installing a landscape planting bed, the method comprising the steps of:
    positioning a panel of porous, permeable material over a base surface in an area which is to contain landscape plantings;
    creating one or more plant receiving openings in the panel;
    positioning one or more landscape plants within said one or more plant receiving openings wherein a root ball of a plant rests at least partially within the plant receiving opening and the stem of said plant extends above the top surface of said panel; and
    blocking the movement of water at the lower surface of the panel with a boundary material.

2. The method of claim 1 further comprising the step of:
    blocking the movement of water beyond the sides of the panel with a boundary material.

3. The method of claim 1 further comprising the step of:
    positioning a water supply to direct irrigation water into the panel.

4. The method of claim 3 further comprising the step of:
    installing a flow control between said water supply and said panel.

5. The method of claim 1 wherein said one or more plant receiving opening are of different sizes.

6. The method of claim 1 wherein said panel is comprised of at least two layers of porous, permeable material.

7. The method of claim 6 wherein said one or more plant receiving openings are made through only the top layer of the panel of porous, permeable material.

8. The method of claim 1 wherein said panel is made of polyurethane foam material.

9. A method of installing a landscape planting bed, the method comprising the steps of:
    positioning a panel of porous, permeable material over a base surface in an area which is to contain landscape plantings;
    positioning one or more landscape plants in relation to the panel such that the plant's roots can grow in the panel;
    positioning a water blocking boundary between said base surface and the lower surface of the panel to prevent the movement of water past said boundary; and
    creating one or more plant receiving openings in the panel; and
    positioning one or more landscape plants within the plant receiving openings, wherein a root ball of a plant rests at least partially within the plant receiving opening and the stem of said plant extends above the surface of said panel such that the plant's roots can grow in the panel.

10. A method of creating an ecosystem for landscape plants, the method comprising the steps of:
    positioning a substantially continuous panel of porous, permeable material over a base surface in an area is to contain one or more landscape plants;
    positioning said one or more landscape plants in relation to the panel such that roots of said plants can grow in the panel;
    providing a water inlet for said panel;
    directing water into said panel;
    blocking the movement of water at the bottom surface of said panel; and
    trapping air within said panel.

11. A method of creating an ecosystem for landscape plants, the method comprising the steps of:
    positioning a substantially continuous panel of porous, permeable material over a base surface in an area is to contain one or more landscape plants;
    positioning said one or more landscape plants in relation to the panel such that roots of said plants can grow in the panel;
    providing a water inlet for said panel;
    directing water into said panel;
    blocking the movement of water at the bottom surface of said panel; and
    said panel being made of polyurethane foam material.

12. An irrigation apparatus for supplying irrigation water to the root zone of a plant:
    a container having lateral and bottom sides defining an interior space;
    a body of porous material positioned within said interior space, said porous material having spaces allowing movement of irrigation water through said body and trapping of air within said body;
    said spaces being of sufficient size to allow plant roots to grow therethrough; and
    a water-impermeable barrier positioned in said interior space between said body and said container.

13. The apparatus of claim 12 further comprising a fluid charge inlet associated with said body for introduction of irrigation water into said body of porous material.

14. The apparatus of claim 13 wherein said fluid charge inlet is a top surface of said body.

15. The apparatus of claim 12 wherein said body has at least one planting hole disposed therein.

16. The apparatus of claim 15 wherein said at least one planting hole is a slit extending from said top surface downward into said body.

17. The apparatus of claim 12 wherein said porous material is selected from the group consisting of open cell foam, polyether polyurethane foam, bonded crumb rubber and polyurethane material, and webbed material.

18. The apparatus of claim 12 wherein said water-impermeable barrier is a waterproof liner.

19. An irrigation apparatus for supplying irrigation water to the root zone of a plant:
    a container having lateral and bottom sides defining an interior space;

a body of porous material positioned within said interior space, said porous material having spaces allowing movement of irrigation water through said body and trapping of air within said body;

said spaces being of sufficient size to allow plant roots to grow therethrough;

a water-impermeable barrier integrally formed with said container.

20. An irrigation apparatus for supplying irrigation water to the root zone of a plant:
- a container having lateral and bottom sides defining an interior space;
- at least one layer of porous material positioned within said interior space, said porous material having spaces allowing movement of irrigation water through said at least one layer of porous material and trapping of air within said at least one layer of porous material;
- said spaces being of sufficient size to allow plant roots to grow therethrough; and
- at least one layer of water-impermeable barrier positioned in said interior space between said at least one layer of porous material and said container.

21. The apparatus of claim 20 further comprising a fluid charge inlet associated with said at least one layer of porous material for introduction of irrigation water into said at least one layer.

22. The apparatus of claim 21 wherein said fluid charge inlet is the top surface of said at least one layer of porous material.

23. The apparatus of claim 20 wherein said at least one layer of porous material comprises a first layer of porous material adjacent said bottom side of said container and a second layer of porous material above and adjacent said first layer of said porous material.

24. The apparatus of claim 20 wherein said at least one layer of porous material has at least one planting hole disposed therein.

25. The apparatus of claim 24 wherein said at least one planting hole is a slit extending from a top surface downward into said at least one layer of porous material.

26. The apparatus of claim 20 wherein said at least one layer of porous material is selected from the group consisting of open cell foam, polyether polyurethane foam, bonded crumb rubber and polyurethane material, and webbed material.

27. The apparatus of claim 20 wherein at least one layer of water-impermeable barrier is integrally formed with said container.

28. An irrigation apparatus for supplying irrigation water to the root zone of a plant:
- a container having lateral and bottom sides defining a planting area;
- a substantially continuous panel formed of porous material positioned within said planting area, said porous material having spaces allowing movement of irrigation water through said panel and trapping of air within said panel;
- said spaces being of sufficient size to allow plant roots to grow therethrough; and
- a water-impermeable barrier positioned in said interior space between said panel and said container.

29. The apparatus of claim 28 further comprising a fluid charge inlet associated with said substantially continuous panel for introduction of irrigation water into said panel.

30. The apparatus of claim 29 wherein said fluid charge inlet is a top surface of said panel.

31. The apparatus of claim 28 wherein said panel has at least one planting hole disposed therein.

32. The apparatus of claim 31 wherein said at least one planting hole is a slit extending from a top surface downward into said panel.

33. The apparatus of claim 28 wherein said substantially continuous panel is selected from the group consisting of open cell foam, polyether polyurethane foam, bonded crumb rubber and polyurethane material, and webbed material.

34. An irrigation method for promoting plant growth comprising:
- supplying irrigation water into a body of porous material positioned throughout the root zone of a planting area within an interior space of a container;
- distributing the irrigation water substantially through said body of porous material;
- trapping air in spaces throughout said body of porous material so as to create available air for plant roots positioned within said body; and
- wherein said step of distributing the irrigation water further comprises moving the water through said spaces throughout said body of porous material.

35. The method of claim 34 wherein said porous material is selected from the group consisting of open cell foam, polyether polyurethane foam, bonded crumb rubber and polyurethane material, and webbed material.

36. The method of claim 34 further comprising the step of blocking the movement of water at substantially all of the peripheral and lower sides of said body.

37. The method of claim 34 wherein said step of supplying irrigation water to said body is supplied at a charge rate so that the water evenly fills the body.

38. A method of promoting plant growth comprising:
- supplying irrigation water into a panel of porous material positioned throughout the root zone of a planting area within an interior space of a container;
- distributing said irrigation water substantially through said panel;
- trapping air in spaces throughout said panel of porous material so as to create available air for plant roots in said panel;
- blocking the egress of water from said panel at substantially all of the peripheral and lower sides of the panel; and
- wherein said step of distributing the irrigation water further comprises moving the water through said spaces throughout said panel of porous material.

39. The method of claim 38 wherein said porous material is selected from the group consisting of open cell foam, polyether polyurethane foam, bonded crumb rubber and polyurethane material, and webbed material.

40. The method of claim 38 wherein said step of supplying irrigation water to said panel is supplied at a charge rate so that the water evenly fills the panel.

41. A method of growing plant material comprising:
- lining the interior of a container with a water-impermeable barrier;
- placing a body of porous material into said container adjacent said water impermeable barrier, said body of porous material having spaces allowing movement of irrigation water through said body and trapping of air within said body;
- forming at least one planting hole in said porous material;
- disposing plant material into said at least one planting hole;
- distributing water into said body; and
- trapping air in the spaces of said body so as to create available air for plant roots therewithin.

* * * * *